United States Patent
Luick

(10) Patent No.: US 7,117,389 B2
(45) Date of Patent: Oct. 3, 2006

(54) MULTIPLE PROCESSOR CORE DEVICE HAVING SHAREABLE FUNCTIONAL UNITS FOR SELF-REPAIRING CAPABILITY

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 10/667,084

(22) Filed: Sep. 18, 2003

(65) Prior Publication Data

US 2005/0066079 A1 Mar. 24, 2005

(51) Int. Cl.
*G06F 11/00* (2006.01)
(52) U.S. Cl. .......................................... 714/11; 714/10
(58) Field of Classification Search ............... 711/11, 711/13, 10
See application file for complete search history.

(56) References Cited

U.S. PATENT DOCUMENTS

| | | | | |
|---|---|---|---|---|
| 5,685,009 A | * | 11/1997 | Blomgren et al. | 712/23 |
| 5,987,587 A | * | 11/1999 | Meltzer | 712/23 |
| 6,148,395 A | * | 11/2000 | Dao et al. | 712/222 |
| 6,691,216 B1 | * | 2/2004 | Kelly et al. | 711/167 |
| 6,725,354 B1 | * | 4/2004 | Kahle et al. | 712/34 |
| 6,785,841 B1 | * | 8/2004 | Akrout et al. | 714/11 |

* cited by examiner

*Primary Examiner*—Bryce P. Bonzo
*Assistant Examiner*—Marc Duncan
(74) *Attorney, Agent, or Firm*—Roy W. Truelson

(57) ABSTRACT

Multiple processor cores are implemented on a single integrated circuit chip, each having its own respective shareable functional units, which are preferably floating point units. A failure of a shareable unit in one processor causes that processor to share the corresponding unit in another processor on the same chip. Preferably, a functional unit is shared on a cycle interleaved basis.

15 Claims, 6 Drawing Sheets

MULTIPLE PROCESSOR CORE DEVICE HAVING SHAREABLE FUNCTIONAL UNITS FOR SELF-REPAIRING CAPABILITY

CROSS-REFERENCE TO RELATED APPLICATION

The present application is related to the following commonly assigned co-pending application, filed on the same date as the present application, which is herein incorporated by reference: Ser. No. 10/667,097 to David A. Luick, entitled "Multiple Parallel Pipeline Processor Having Self-Repairing Capability".

FIELD OF THE INVENTION

The present invention relates to digital data processing hardware, and in particular to the design of multiple processing unit devices for processing data.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of the various components, and particularly the clock speed of the processor. E.g., if everything runs twice as fast but otherwise works in exactly the same manner, the system will perform a given task in half the time. Early computer processors, which were constructed from many discrete components, were susceptible to significant speed improvements by shrinking and combining components, eventually packaging the entire processor as an integrated circuit on a single chip. The reduced size made it possible to increase the clock speed of the processor, and accordingly increase system speed.

In addition to increasing clock speeds, it is possible to improve system throughput by using multiple copies of certain components, and in particular, by using multiple CPUs. The modest cost of individual processors packaged on integrated circuit chips has made this practical. While there are certainly potential benefits to using multiple processors, additional architectural issues are introduced. Without delving deeply into these, it can still be observed that there are many reasons to improve the speed of the individual CPU, whether or not a system uses multiple CPUs or a single CPU. If the CPU clock speed is given, it is possible to further increase the speed of the individual CPU, i.e., the number of operations executed per second, by increasing the average number of operations executed per clock cycle.

Most modern processors employ concepts of pipelining and parallelism to increase the clock speed and/or the average number of operations executed per clock cycle. Pipelined instruction execution allows subsequent instructions to begin execution before previously issued instructions have finished, so that execution of an instruction overlaps that of other instructions. Ideally, a new instruction begins with each clock cycle, and subsequently moves through a pipeline stage with each cycle. Because the work of executing a single instruction is broken up into smaller fragments, each executing in a single clock cycle, it may be possible to increase the clock speed. Even though an instruction may take multiple cycles or pipeline stages to complete, if the pipeline is always full, the processor executes one instruction every cycle.

Floating point calculations are among the most time-consuming instructions for processors to perform. In order to increase throughput when handling floating point data, most modern high-performance processors have some form of special floating point functional unit for performing floating point calculations. Due to the complexity of floating point calculations, a floating point unit is generally implemented as a pipeline. Such a pipeline typically requires a significant area of an integrated circuit chip, composed primarily of custom logic. Even though floating point operations are not initiated in every cycle, the circuits within a floating point pipeline have a high degree of switching activity, and consume considerable power at the operating frequencies typical of such devices. The power density, i.e., the amount of power consumed per unit area of chip surface, tends to be significantly greater within the floating point pipelines and similar special units than in many other areas of the processor chip, such as cache arrays and registers. This high level of activity and high power consumption makes the floating point pipeline area of the processor chip particularly susceptible to failure.

In a conventional processor, the failure of any part of a floating point unit generally means that the processor is no longer able to process some subset of the instruction set, i.e., the floating point instructions. Even though only a fraction of the total instructions executed are floating point instructions, if these are interspersed with other instructions in a task thread, the processor will generally be unable to execute it. As a result, the processor may be effectively disabled. This may in turn cause system failure, although in many multiple-processor computer systems, the system can continue to operate, albeit at a reduced throughput, using the remaining functioning processors.

In order to increase the success and acceptability of high-performance processor designs, it is desirable to reduce the frequency of processor failure, and in particular, the frequency of processor failure as a result of failure in some circuitry within a floating point pipeline or similar functional unit. A need exist for improved designs to counter the vulnerability of complex high-performance processors.

SUMMARY OF THE INVENTION

Multiple processor cores are implemented on a single integrated circuit chip, each having its own respective shareable functional units. A failure of a shareable functional unit in one of the processors causes the processor to share the corresponding functional unit in at least one other processor on the same circuit chip.

In one aspect of the preferred embodiment, the shareable functional unit is a floating point pipeline. In general, a new floating point operation is not started in the pipeline with every cycle, since floating point operations constitute only a subset of a larger instruction set. Therefore, a floating point pipeline normally has considerable unused capacity, which is typically more than enough to accommodate the needs of a second processor executing an independent thread of instructions. In the event of failure of a floating point unit in one processor on the circuit chip, a floating point unit in an adjacent processor is shared between the processor to which it is normally assigned and the processor having the failed floating point unit.

In another aspect of the preferred embodiment, a shareable functional unit is shared on a time interleaved basis. Specifically, in the preferred embodiment a new instruction from a first processor may be initiated in the shared functional unit on even clock cycles, and a new instruction from a second processor may be initiated on odd clock cycles. New instructions "may be initiated", because whether an instruction is actually initiated depends on whether there is a currently pending instruction requiring the shared functional unit in the corresponding processor. If one assumes that, on the average, fewer than half of the instructions in a thread require the services of the shared functional unit, then in general there will be little or no queuing of operations waiting to execute in the shared functional unit, and at most an operation will wait only a single cycle (from even to odd, or vice versa) for an assigned execution time slice.

A set of shareable functional unit processors constructed in accordance with the preferred embodiment of the present invention has the capability to continue operating in the event of failure of a one of the functional units, with relatively little degradation of performance. Moreover, because functional units are shareable, it is not necessary to duplicate a functional unit in order to provide system redundancy. Only a relatively small amount of additional input and output selection circuitry and related control circuitry is required for implementation of such a design.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
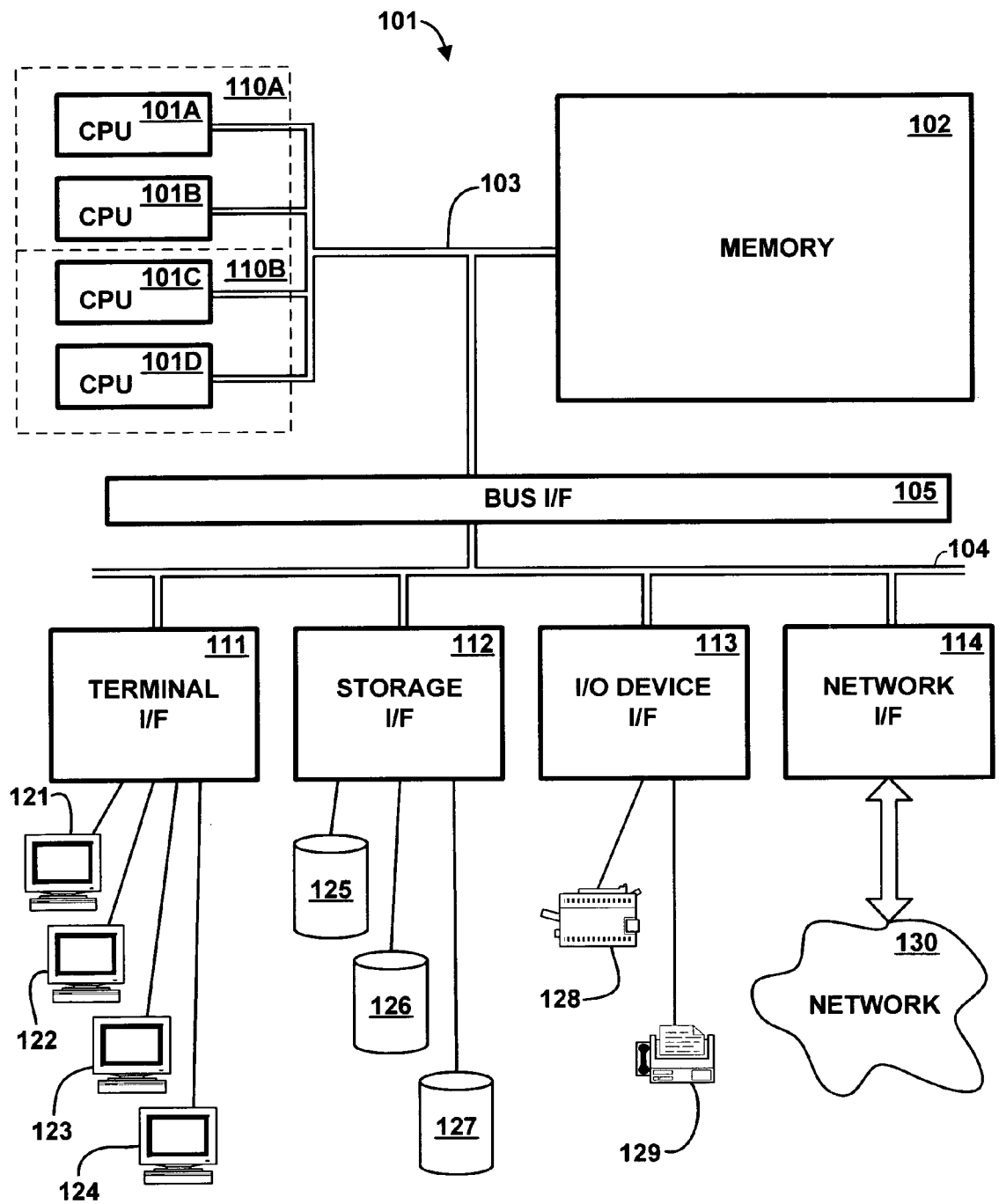
FIG. 1 is a high-level block diagram of the major hardware components of a computer system utilizing a multiple processor core device having shareable functional units, according to the preferred embodiment of the present invention.

Referring to the Drawing, wherein like numbers denote like parts throughout the several views, FIG. 1 is a high-level representation of the major hardware components of a computer system 100 utilizing a multiple processor core device having shareable functional units, according to the preferred embodiment of the present invention. The major components of computer system 100 include multiple central processing units (CPU) 101A–101D, main memory 102, terminal interface 111, storage interface 112, I/O device interface 113, and communications/network interfaces 114, all of which are coupled for inter-component communication via buses 103, 104 and bus interface 105.

System 100 contains multiple general-purpose programmable central processing units (CPUs) 101A–101D, herein generically referred to as feature 101. Physically, processors 101 are implemented as multiple processor core devices 110A, 110B, herein generically referred to as feature 110. I.e., in the preferred embodiment, each multiple processor core device 110 is a monolithic integrated circuit chip containing multiple processors 101, also referred to as processor cores. In the preferred embodiment, each multiple core device 110 contains two processors 101. Using current technology, it would be difficult to implement more than two processors on a single chip; however, it will be understood that the present invention is not limited to a chip containing two processors, and that future improvements in integrated circuit technology may make it possible to implement more than two processors on a chip.

Each processor 101 executes instruction stored in memory 102, and may include one or more levels of cache, some of which may be shared with another processor or processors on the same chip. Memory 102 is a random-access semiconductor memory for storing data and programs. Memory 102 is conceptually a single monolithic entity, it being understood that memory is often a more complex arrangement, such as a hierarchy of caches and other memory devices.

Memory bus 103 provides a data communication path for transferring data among CPUs 101, main memory 102 and I/O bus interface unit 105. I/O bus interface 105 is further coupled to system I/O bus 104 for transferring data to and from various I/O units. I/O bus interface 105 communicates with multiple I/O interface units 111–114, which are also known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121–124. Storage interface unit 112 supports the attachment of one or more direct access storage devices (DASD) 125–127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. Several particular examples of such additional complexity or additional variations are disclosed herein, it being understood that these are by way of example only and are not necessarily the only such variations.

Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPUs 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121–124, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention.

Figure 2:
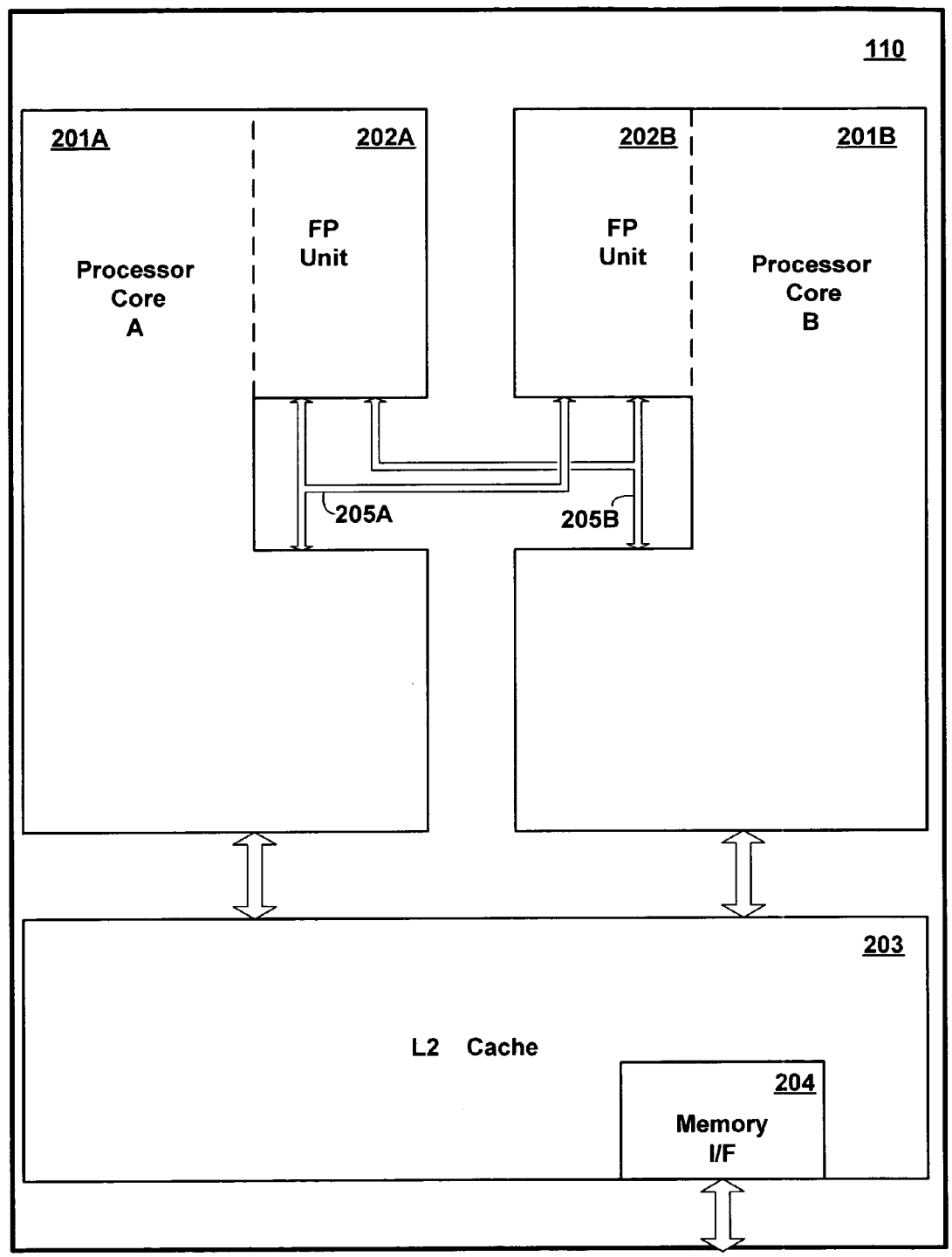
FIG. 2 is a high-level diagram showing the major components of an integrated circuit chip having multiple processor cores, according to the preferred embodiment.

FIG. 2 is a high-level diagram showing the major components of an integrated circuit chip having multiple processor cores, according to the preferred embodiment. Referring to FIG. 2, integrated circuit chip 110 includes a pair of identical processor cores 201A, 201B, herein generically referred to as feature 201. Each processor core includes a respective shareable functional unit 202A, 202B, herein generically referred to as feature 202. In the preferred embodiment, functional units are floating point units (FP units), i.e., pipelines which perform floating point operations on data. However, a shareable functional unit in accordance with the present invention might be something other than a floating point unit.

Shareable functional units 202A, 202B have the capability to substitute for each other in the event that any single one of the shareable units becomes disabled. A data and control path 205A exists for transferring data and execution control signals between various components of processor core 201A and its associated floating point unit 202A. However, data and control path 205A includes an alternate path to floating point unit 202B. In the event of a failure of floating point unit 202A, the alternate path portion of data and control path 205A can be used to transfer data and execution control signals between processor core 201A and floating point unit 202B, allowing floating point unit 202B to serve both processor cores 201A, 201B simultaneously. Similarly, a data and control path 205B exists for transferring data and execution control signals between various components of processor core 201B and its associated floating point unit 202B, and in the event of a failure in floating point unit 202B, path 205B can be used to allow processor core 201B to access floating point unit 202A.

Chip 110 further includes Level 2 cache (L2 cache) 203, and memory interface 204. L2 cache 203 is preferably a non-discriminated cache containing both instructions and non-instruction data. L2 Cache 203 is coupled to memory interface 204, which loads data from or stores it to an external (i.e., off chip) memory location, which is generally main memory 102, although it could be another level of cache. L2 cache 203 and memory interface 204 are shared units, to be distinguished from shareable units. I.e., as shown in FIG. 2, there is one and only one L2 cache 203, and one and only one memory interface 204. Both processor cores 201A, 201B use the same L2 cache and memory interface. The use of a single memory interface 204 is preferred because it reduces the number of I/O pins required on the chip; the use of a L2 cache (as opposed to two smaller caches) increases the probability of a cache hit. However, it would alternatively be possible for each processor core to have its own L2 cache and external interface.

Figure 3:
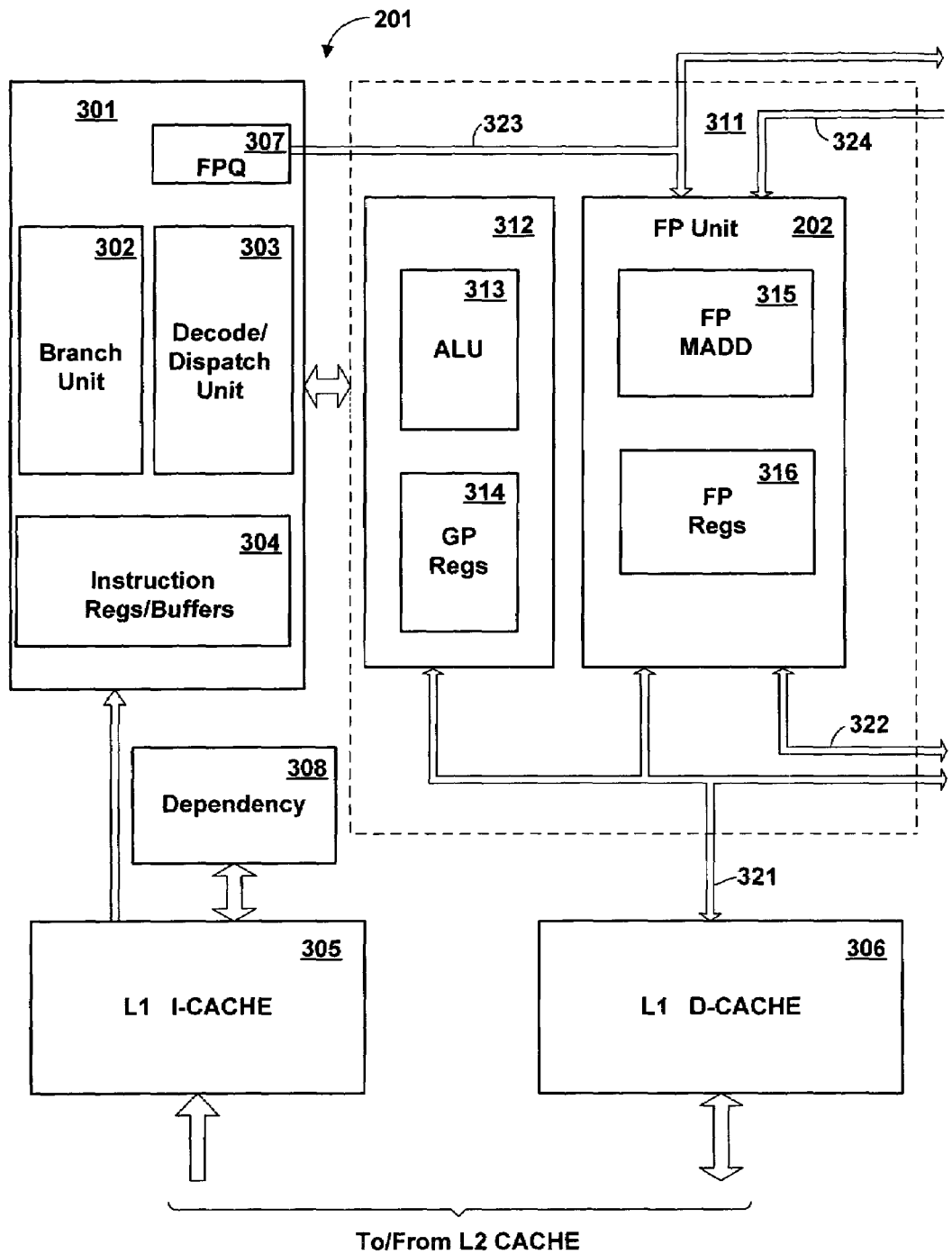
FIG. 3 is a high-level diagram of the major components of a single processor core having a shareable floating point unit, according to the preferred embodiment.

FIG. 3 is a high-level diagram of the major components of a single processor core 201 within integrated circuit chip 110, having a shareable floating point unit 202, according to the preferred embodiment. FIG. 3 shows core 201 in greater detail than is depicted in FIG. 2. Core 201 includes instruction unit portion 301, execution unit portion 311, Level 1 Instruction Cache (L1 I-Cache) 305, and Level 1 Data Cache (L1 D-Cache) 306. In general, instruction unit 301 obtains instructions from L1 I-cache 305, decodes instructions to determine operations to perform, and resolves branch conditions to control program flow. Execution unit 311 performs arithmetic and logical operations on data in registers, and loads or stores data from L1 D-Cache 306. L1 I-Cache 305 and L1 D-Cache 306 obtain data from (and, in the case of L1 D-Cache, store data to) shared L2 Cache 203.

Instruction unit 301 comprises branch unit 302, instruction decode/dispatch unit 303, instruction registers and buffers 304, and floating point instruction queue 307. Instructions from L1 I-cache 305 are loaded into buffers 304 prior to execution. Depending on the CPU design, there may be multiple buffers (e.g., one for a sequential series of instructions, and others for branch-to locations), each of which may contain multiple instructions. Decode/dispatch unit 303 selects one or more instructions to be dispatched for execution from one of the buffers 304 in a current machine cycle, and decodes the instruction or instructions to determine the operation(s) to be performed or branch conditions. Branch unit 302 controls the program flow by evaluating branch conditions, and refills buffers 304 from L1 I-cache 305. Floating point queue 307 is a short queue for holding floating point instructions which are awaiting an available cycle for execution in a floating point unit. When a floating point instruction is selected for execution by decode/dispatch unit 303, it is placed on floating point queue 307. Floating point queue 307 may contain the full instruction, or it may contain a partially decoded form of the instruction. For example, those bits necessary to identify an instruction as a floating point instruction may be omitted from queue 307, since all instructions in the queue are necessarily floating point instructions. Preferably, floating point queue 307 also contains a thread ID bit for each instruction, identifying the thread with which the instruction is associated; the thread ID bit is used to identify source or destination registers for the operation.

L1 I-cache 305 and L1 D-cache 306 are separate instruction and data caches providing data to instruction and execution units. Typically, data is taken from or stored to an L1 cache by the instruction or execution unit, and if the data is unavailable in an L1 cache, it is loaded into the L1 cache from shared L2 cache 203, which in turn obtains it from a location external to chip 110 (e.g., from main memory 102,). Depending on the processor design, it may be possible to by-pass an L1 cache and load data from L2 cache 203 to an execution or instruction register. Memory interface 204 handles the transfer of data across memory bus 103, which may be to main memory or to I/O units via bus interface 105.

Execution unit 311 comprises an integer unit 312 and a floating point unit 202. Integer unit 312 includes a set of general purpose registers 314 for storing data and an integer arithmetic logic unit (ALU) 313 for performing arithmetic and logical operations on data in GP registers 314, responsive to instructions decoded by instruction unit 301. Integer ALU 313 is preferably implemented as multiple (preferably two) pipelines which operate independently, although it might be a single pipeline, or might even be a non-pipelined implementation. Execution unit 311 further includes floating point unit 202 for performing floating point operations. Floating point unit 202 includes a set of floating point registers 316, and a floating point multiply/add (MADD) pipeline 315. The operation of floating point unit 202 is described in greater detail herein. In addition to components shown in FIG. 3, execution unit 311 may include additional special purpose registers and counters, load and store hardware for fetching data from or storing it to cache or memory, control hardware, and so forth. In particular, execution unit 311 may include additional pipelines (not shown) separate from the floating point MADD pipeline 315 and integer ALU pipeline(s) 313. For example, execution unit 311 may contain one or more load/store pipelines for transferring data between GP registers 314 or floating point registers 315 on the one hand and some form of memory (generally L1 D-Cache 306) on the other. Additional pipelines, such as an instruction fetch and decode pipeline, may exist within processor core 201.

Load/store bus 321 provides a communications path for loading data from L1 D-Cache 306 to any of GP Registers 314 or FP Registers 316, or storing data back to the L1 D-Cache. Load/store bus 321 contains an additional outbound path, whereby in an alternate operating mode data can be loaded from L1 D-Cache 306 to a floating point register (not shown) in the complementary processor core on the same chip 110 as processor core 201, as explained more fully herein. The complementary processor core similarly contains a load/store bus, a portion of which is shown as feature 322, which is used to load data from its local L1 D-Cache to its local GP registers and FP registers. In an alternate operating mode, load store bus 322 can also load data from the L1 D-Cache of the complementary processor core to FP registers 316 in processor core 201.

Floating point instruction bus 323 provides a path for instruction control signals from floating point instruction queue 307 to FP unit 202, which control the selection of registers and operations performed in FP unit 202. FP instruction bus 323 contains an additional output path, whereby in an alternate operating mode instructions from floating point queue 307 can be executed in the floating point unit (not shown) of the complementary processor core on the same chip 110 as processor core 201. The complementary processor core similarly contains a floating point instruction bus, a portion of which is shown as feature 324, which is used to control the operation of its local floating point unit. In an alternate operating mode, floating point instruction bus 324 can also direct the execution of instructions in floating point unit 202 in processor core 201.

Data and control path 205, represented at a high level of abstraction in FIG. 2, includes load store bus 321 and floating point instruction bus 323. It may include additional control or status lines (not shown).

While various components of processor core 201 have been described and shown at a high level, it should be understood that the processor core of the preferred embodiment contains many other components not shown, which are not essential to an understanding of the present invention. For example, various additional special purpose registers will be required in a typical design. Furthermore, it will be understood that the processor core of FIG. 3 is simply one example of a CPU architecture, and that many variations could exist in the number, type and arrangement of components within processor core 201, that components not shown may exist in addition to those depicted, and that not all components depicted might be present in a processor design. For example, the number and configuration of buffers and caches may vary; the number and function of execution unit pipelines may vary; registers may be configured in different arrays and sets; etc.

In the preferred embodiment, processor core 201 is a multithreaded processor supporting the concurrent execution of multiple threads and simultaneous dispatching of instructions from different threads in the same machine cycle. In the preferred embodiment, the concurrent execution of two independent threads is supported, it being understood that this number may vary. Each instruction executed in processor core 201 performs a single primitive operation, such as a load, a store, an integer arithmetic or logical operation using operands from GP registers, a floating point multiply or add using operands from FP registers, or a branch. Decode/dispatch unit 303 can simultaneously dispatch multiple such instructions in a single machine cycle. In the preferred embodiment, up to four instructions may be dispatched in a single cycle, although this number may vary.

Instructions within each executing thread are grouped in groups of non-dependent sequential instructions. When instructions are loaded into L1 I-Cache 305 from L2 Cache, dependency check unit 308 automatically analyzes the instruction stream to determine which instructions can be executed concurrently or out of sequence. The dependency check unit divides the instruction stream into groups of sequential instructions by placing a stop bit at the last instruction of each group. Within any group, the instructions have no dependencies and can safely be executed out of sequence. Specifically, with respect to each instruction, dependency check unit determines whether there is some dependency upon completion of a previous instruction in the same group. Dependency depends on the type of instruction and the operand(s). Where two different instructions reference the same operand, this often, but not always, creates a dependency. E.g., if both instructions use the same operand as a source for data which is read or input to some pipeline, no dependency exists. But if a first instruction writes to an operand location and a second instruction reads from the same location, the second instruction is clearly dependent on the first, and can not be executed before or simultaneously with the first instruction. If a dependency is found within the same group, the dependency check unit places a stop bit in the immediately preceding instruction, so that the instruction being analyzed will be part of a separate group.

Instruction buffer 304 holds instructions from two independent threads. One thread is designated primary (having a higher priority of execution), and the other secondary. In each machine cycle, decode/dispatch unit may select up to four instructions for dispatch to a corresponding unit (generally a pipeline) which executes the instruction. There are preferably two parallel integer ALU pipelines in integer ALU unit 313, allowing up to two integer ALU instructions to be dispatched; there is a single floating point pipeline, allowing a single floating point instruction to be dispatched; and so on. Decode/dispatch unit 303 selects instructions from the current group of instruction in the primary thread, to the extent there are unexecuted instructions in the group matching the available pipeline resources. If fewer than four instructions in the primary thread can be matched to the available pipelines, the decode/dispatch unit selects unexecuted instructions from the current group in the secondary thread. When all instructions within a group in either thread have been dispatched for execution, the next group of instructions in that thread is made available for selection on the next machine cycle.

In order to support concurrent execution of multiple threads, a separate set of GP registers 314 and a separate set of FP registers 316 exist for each thread. Additionally, certain other state or special purpose registers (not shown) may be duplicated to support multiple active threads.

In accordance with the preferred embodiment, a pair of processor cores is implemented on the same integrated circuit chip, and each processor core contains a respective shareable floating point unit. In normal operation, the floating point unit within each processor core performs floating point operations responsive to instructions within threads executing in that processor core, i.e., responsive to instructions dispatched by the respective decode/dispatch unit within each processor core. In the event that any single floating point unit becomes inoperable (fails), the complementary floating point unit in the other processor core is placed in a special mode of operation, whereby it is shared by both processor cores. I.e., in this special mode of operation, it executes floating point operations dispatched by both processor cores. Preferably, this is accomplished by interleaving floating point operations from the two cores on a cycle-by-cycle basis, although other forms of sharing would be possible. Thus, each processor core has three modes of operation: a normal mode in which it has exclusive use of its own floating point unit, an FP sharing mode in which it shares its floating point unit with the complementary processor core on the same chip, and an FP disabled mode in which its own floating point unit is disabled, and it shares the floating point unit in the complementary processor core on the same chip.

Figure 4:
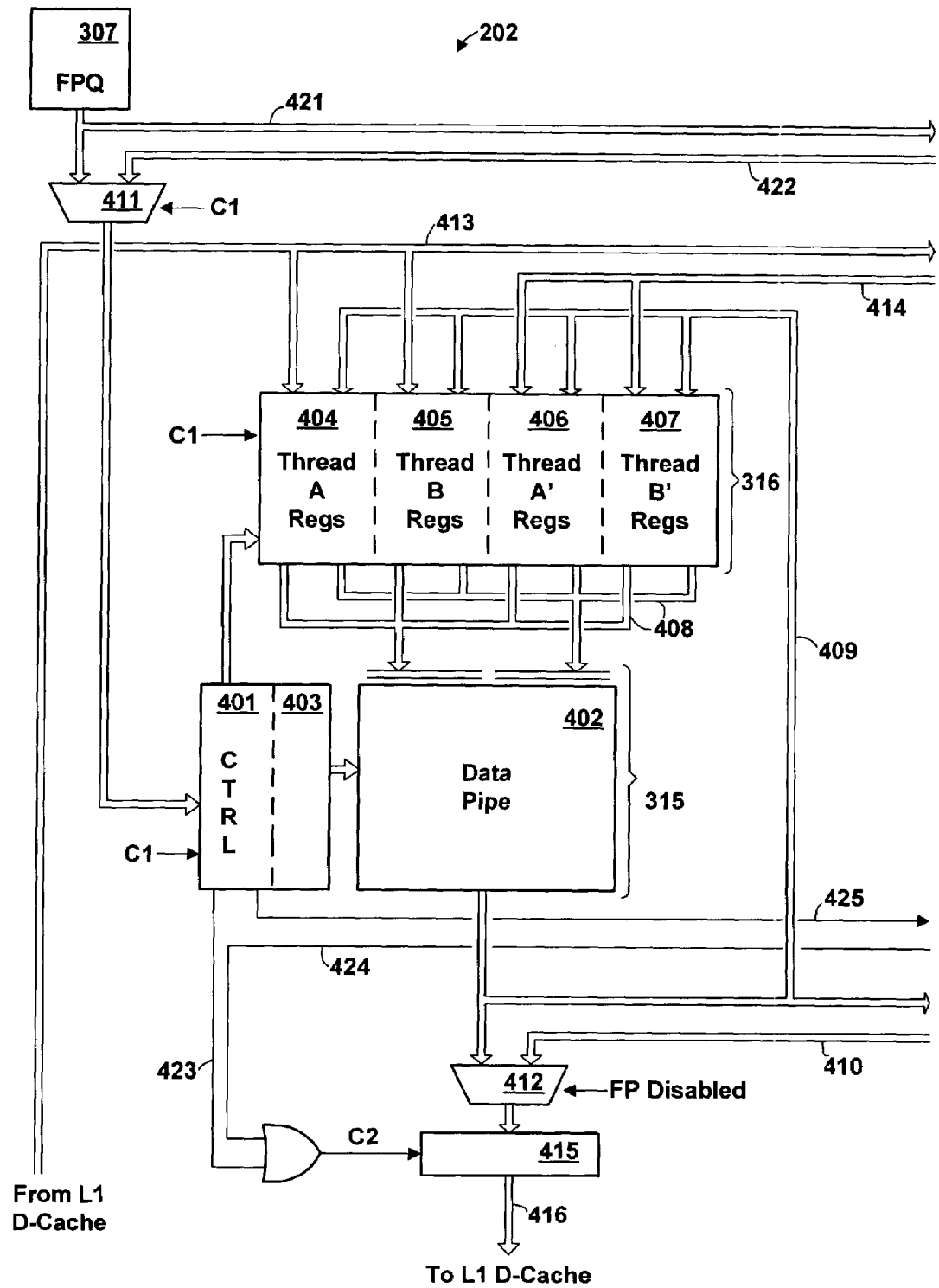
FIG. 4 is a diagram showing in greater detail a shareable floating point unit within one of the processor cores, according to the preferred embodiment.

FIG. 4 is a diagram showing in greater detail some of the major components of a shareable floating point unit 202 within one of processor cores 201, according to the preferred embodiment. The heart of floating point unit 202 is floating point MADD pipeline 315, comprising a pipeline control decoder 401, a data pipe 402, and destination bits 403. Data pipe 402 is a multi-stage pipeline for processing floating point data operands responsive to control signals from pipeline control decoder 401. Control decoder obtains instructions for execution from floating point queue 307, and decodes the instructions to appropriate control signals for directing data pipe 402. Destination bits 403 are a pair of bits at each pipe stage, which record the thread ID and processor core (core 201 or its complement) from which an instruction originated. Destination bits follow the data through the various stages of the pipe, hence a separate pair of bits is associated with each stage. When processed data emerges from pipe 402, destination bits 403 are used to determine the destination for the data. Destination bits 403 are shown as a separate part of control decoder 401 for illustrative purposes, although in fact they would typically be implemented as an integral part of control decoder.

Floating point register file 316 is a bank of registers providing source operand data to, and receiving resultant data from, data pipe 402. Registers 316 contain four sets of independent registers 404–407, each corresponding to a different thread. Register set 404 corresponds to the primary thread executing in processor core 201; register 405 corresponds to the secondary thread executing in processor core 201; register set 406 corresponds to the primary thread executing in the processor core which is the complement of core 201 on the same chip 110; and register set 407 corresponds to the secondary thread executing in the processor core which is the complement of core 201. In the preferred embodiment, each FP register set 404–407 contains 32 registers capable of being designated as operands, each register containing 64 bits, although these parameters may vary. A floating point instruction decoded for execution by floating point unit 202 may specify any of the 32 registers within a register set as a source or destination operand for a pipeline operation; however, the set itself is determined by the context of the instruction, i.e., the processor core and thread from which the instruction originated. Each instruction may specify two source operands, which are input to data pipe 402 via source operand buses 408 as operands A and B.

Selector logic 411 selects either a floating point operation from floating point queue 307, or a floating point operation from the corresponding floating point queue in the complementary processor, for execution by floating point unit 202, responsive to control signal C1 (explained more fully herein). FP Operation bus 421 transmits an FP operation from queue 307 to selector 411, ans also transmits the operation to a corresponding selector in the complementary processor. A similar FP Op bus in the complementary processor (a portion of which is shown as feature 422) transmits FP operations from the complementary processor's FP queue to selector 411. The operation selected by selector 411 is input to control decoder 401, which selects operand registers and initiates operations based on the instruction. Control signal C1 simultaneously serves as a select input to register file 316, to select between the local thread sets 404 and 405 on the one hand, or the complementary processor's thread sets 406 and 407, on the other hand. I.e., an instruction originating in processor 201 is automatically deemed to reference register set 404 (if the thread ID is set to the primary thread) or register set 405 (if the thread ID is set to the secondary thread), while an instruction originating in the complementary processor is deemed to reference either register set 406 or 407, depending on the thread ID.

Data emerging from data pipe 402 is output via destination bus 409 to register file 316. The destination bit pair 403 corresponding to the emerging data determines which register set of sets 404–407 is the intended destination for the data. Additional paths in destination bus 409 allow data emerging from the pipeline to be directly stored in the L1 D-Cache 306 of processor core 201 via selector 412, store bus register 415, and store bus 416, or in the corresponding L1 D-Cache of the complementary processor. The complementary processor contains a corresponding destination bus, a portion of which is shown as feature 410. Data bound for the L1 D-Cache passes through selector 412, which can select either the output of data pipe 402 from bus 409 or the output of the corresponding data pipe in the complementary processor core from bus 410. When processor core 201 is operating in FP disabled mode, the data pipe output of the complementary processor core is selected; otherwise it selects its own data pipe (data pipe 402). A selector corresponding to selector 412 exists in the complementary processor. When processor 201 is operating in FP sharing mode (and the complementary processor is necessarily in FP disabled mode), the output of pipe 402 is selected by this complementary selector for writing to the L1 D-Cache of the complementary processor core.

Load bus 413 is used to load data from L1 D-Cache 306 to FP registers 316 responsive to floating point load instructions in FP queue 307. Load bus 413 further includes a path for loading data to register sets in the complementary processor core. When processor core 201 is operating in FP disabled mode, load bus 413 is thus used to load data from L1 D-Cache to a pair of register sets in the complementary processor. Load bus 413 specifically loads data to register sets 404 and 405, and does not access register sets 406 and 407. Register sets 406 and 407 are used for threads executing in the complementary processor when processor 201 is in FP sharing mode (and the complementary processor's floating point unit is disabled). In this case all data for register sets 406 and 407 must be loaded from the L1 D-Cache in the complementary processor. For this purpose, the corresponding load bus in the complementary processor (a portion of which is shown as feature 414) transfers data from the complementary processor's L1 D-Cache to register sets 406 and 407.

In the preferred embodiment, when operating in FP sharing mode, floating point operations are taken in alternating machine cycles from the local floating point queue 307 and the corresponding floating point queue in the complementary processor core. Both processor cores on chip 110 are synchronized to a common clock signal. Each processor core is assigned a respective even or odd set of clock cycles. If processor core 201 is arbitrarily assumed to be odd, then control signal C1 may be expressed as follows:

$$C1 = FP\_Sharing\_Mode \text{ AND } Even\_Clock\_Cycle$$

Thus, if processor core 201 is not operating in FP sharing mode, C1 is always 0, meaning that the local FP queue 307 is selected (and that the first half of FP register file, consisting of register sets 404 and 405, is selected when referencing source operands for source operand bus 408). If the processor is operating in sharing mode, the local FP queue 307 (along with register sets 404 and 405) will be selected on odd clock cycles, and the FP queue in the complementary processor (along with register sets 406 and 407) will be selected on even clock cycles.

Signal C2 is a clock signal used to clock data into store bus register 415 for writing to L1 D-Cache 306. In the abstract sense, signal C2 is the logical AND of the processor clock and the existence of emergent data from a floating point pipe which is intended for processor core 201. Signal C2 is produced as the logical OR of two separate signals, one from control unit 401 and the other from the corresponding control unit in the complementary processor core. Control unit 401 produces a signal on line 423 whenever new data emerges from pipe 402 intended for processor core 201, while the corresponding control unit in the complementary processor core produces such a signal on line 424 whenever data emerges from its respective pipe intended for processor core 201. Control unit 401 similarly produces a signal on line 425 whenever new data emerges from pipe 402 intended for the complementary processor core (i.e., when operating in FP sharing mode). Thus, in normal operating mode or in FP sharing mode, signal C2 is a clock signal which rises and falls with the processor cycle clock whenever new data emerges from pipe 402 which is intended for processor core 201. When operating in FP disabled mode, signal C2 rises and falls only on those processor clock cycles in which data intended for processor core 201 is emerging from the corresponding pipe in the complementary processor. Since the number of cycles in the data pipe may vary, data does not necessarily always emerge on an odd (or even) cycle. One of the bits in destination bit pair 403 is used to determine the correct processor core to which the emerging data corresponds.

It will be observed that this form of time multiplexing, in which fixed clock cycles are assigned to each processor core, is not necessarily the most efficient. It is possible that floating point operations will back up in one of the queues, while there are no floating point operations to perform in the other queue, and the floating point unit is idled every other cycle. This arrangement is chosen in the preferred embodiment because it considerably simplifies the control logic. The present invention is based on the theory that most transactional processing environments do not have extremely heavy usage of floating point operations, and utilizing the floating point processor at 50% of capacity will not generally cause significant performance problems. A small floating point queue 307 is provided for those cases where several floating point operations execute in close succession. Preferably, this queue contains about 4 instructions, although the number could vary. It would alternatively be possible to use other schemes for sharing a floating point unit. For example, control logic could exist which, when operating in FP sharing mode, chooses a floating point operation from queue 307 on odd clock cycles, and if no floating point operation is pending in queue 307 on an odd cycle, then chooses an operation from the corresponding floating point queue in the complementary processor core.

Figure 5:
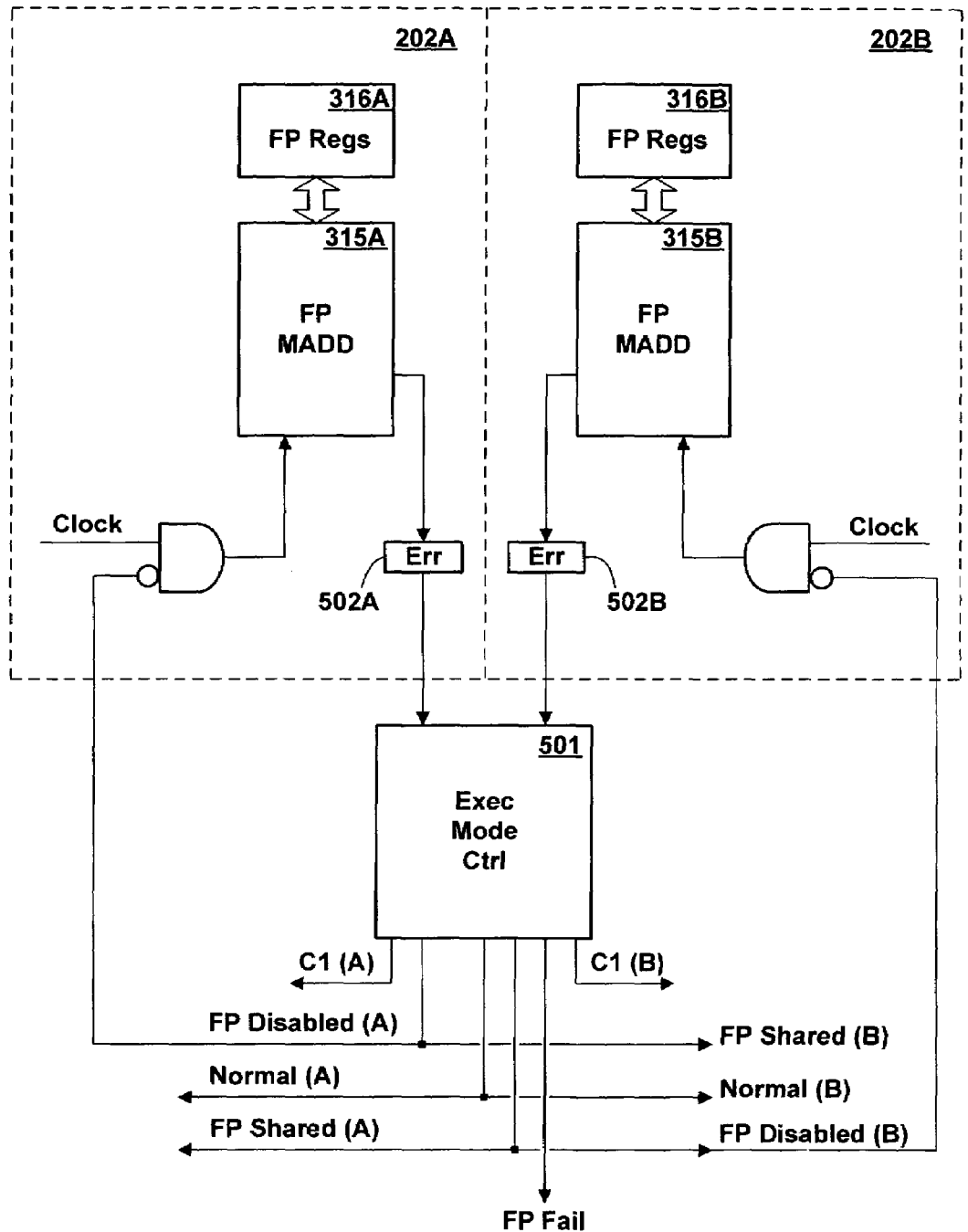
FIG. 5 illustrates the hardware control logic which controls operating mode for the floating point units, according to the preferred embodiment.

FIG. 5 illustrates the hardware control logic which controls operating mode for the floating point units, according to the preferred embodiment. As shown in FIG. 5, a pair of floating point units are contained on a common integrated circuit chip 110, each comprising respective floating point registers 316A, 316B and floating point MADD units 315A, 315B. FP MADD units 315A, 315B are coupled to respective error registers 502A, 502B, which provide input to execution mode control logic 501. Additionally, a processor clock signal (not shown) is input to mode control logic. Mode control 501 uses these various inputs to generate mode or control signals for enabling sharing of floating point units.

In the preferred embodiment, each FP MADD unit is associated with a respective error register 502A, 502B, containing a hard error bit indicating whether an unacceptable hard error has been detected in the corresponding MADD unit, the unit is considered to be inoperable. Each register 502A, 502B may additionally include one or more bits used to record soft errors. In the preferred embodiment, error conditions are detected by checking parity of data quantities at various stages of the pipeline. A single isolated parity error may be considered a "soft" error, but if the parity error is repeated after retrying the operation, or if isolated parity errors appear at an unacceptable frequency, the error condition will be considered a "hard" error, meaning that the floating point unit is inoperable, and the corresponding hard error bit in one of registers 502A, 502B will be set.

Additional techniques for detecting error conditions may be used in addition to or in place of parity checking. Various such techniques are known in the art, and an error condition may be detected using any of these various techniques, or any technique hereafter developed. For example, special hardware can detect invalid machine states; selective microcode instructions might exercise unused pipeline portions with test data to verify function; low-level system software may run test data through the pipelines during idle machine cycles; etc.

Execution mode control 501 produces control signals C1(A), C1(B), Disabled(A), Disabled(B), Normal and FP_Fail. Signal C1(A) is the C1 signal (explained above) used to select a floating point queue input for floating point unit 202A, while signal C1(B) is the C1 signal for floating point unit 202B. Signal DisabledA indicates that processor core 202A is operating in FP disabled mode and processor core 202B is in FP sharing mode; this signal is generated by control 501 if register 502A indicates a hard error and register 502B does not. Similarly, signal DisabledB indicates that processor core 202B is operating in FP disabled mode and processor core 202A is in FP sharing mode, and is generated if register 502B indicates a hard error and register 502A does not. Signal Normal indicates both processors are in normal mode, i.e., neither register 502A, 502B indicates a hard error.

Signal FP_Fail indicates a hard error has been detected in both floating point units and is recorded in both registers 502A, 502B, i.e., neither FP unit is functioning properly. Depending on the system environment, an FP_Fail signal may cause both processor cores to become inoperable. However, in a preferred system environment, it is possible to assign all execution threads containing any floating point instructions to different processors, so that the processor pair which caused the FP_Fail signal to be generated continue to operate, but process only execution threads without any floating point instructions.

The clock input signals to the FP MADD units are gated by the complement of the respective FP disable signals. If operating in FP_Disable mode, the clock to the FP MADD unit is disabled, so that no activity takes place in the FP MADD unit, thus reducing power consumption.

In operation, the floating point units are continually or periodically monitored using any technique as described, and a hard error in one of the units is recorded in the corresponding error detection register 502A, 502B. Assuming only one unit of the pair is non-functioning, data is transferred from the registers in the non-functioning unit to the good unit, and FP sharing is enabled in the good unit. These operations may be accomplished entirely in hardware, without intervention by the operating system.

Figure 6:
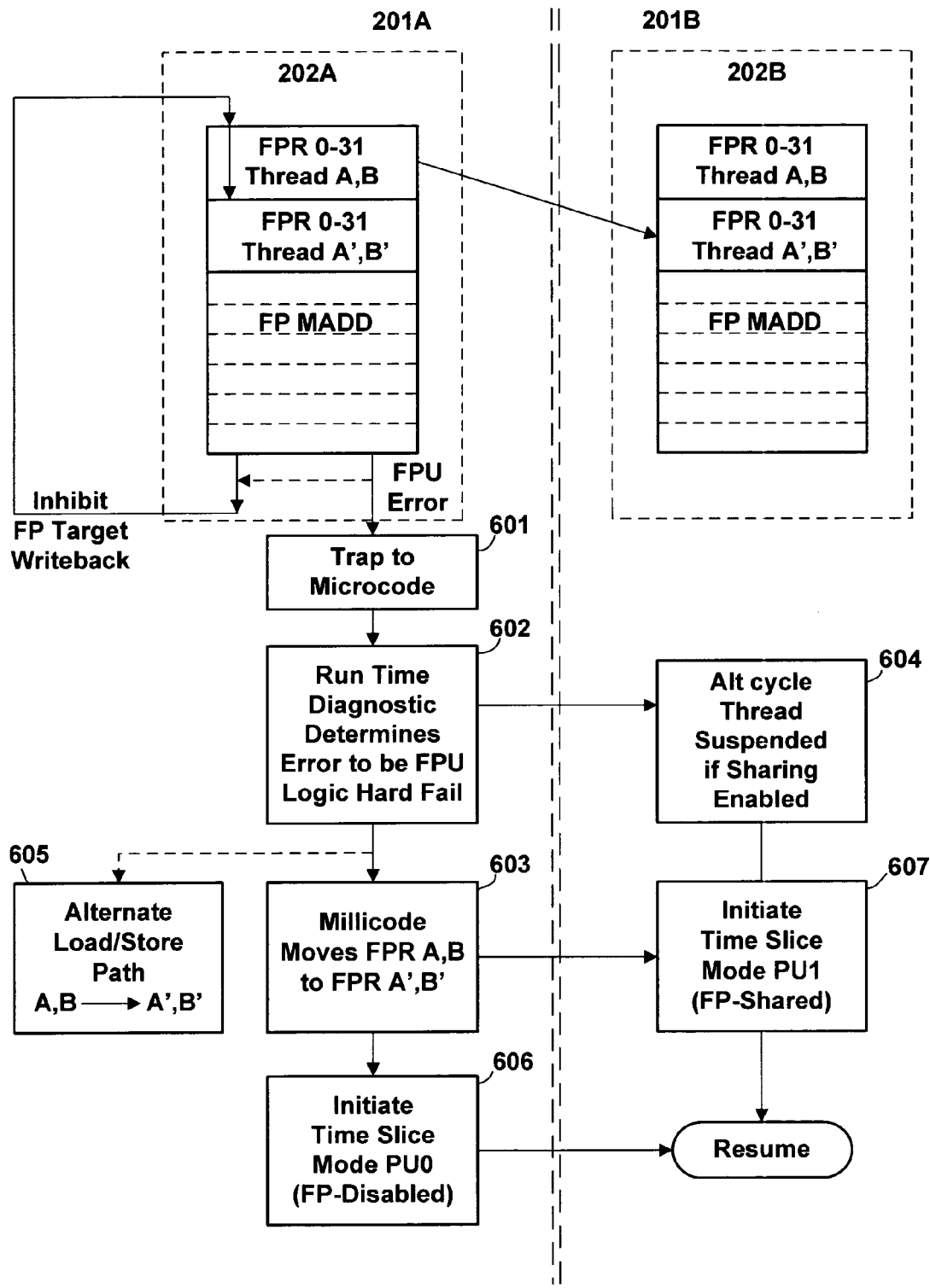
FIG. 6 illustrates the steps taken by a system in response to a hardware error in a floating point unit, according to a preferred system environment.

FIG. 6 illustrates the actions taken upon detection of a hard error. Unit 202 A is arbitrarily chosen as the unit experiencing an error in the example of FIG. 6, it being understood that the mirror image operations would be performed in the case of an error in unit 202B. As shown in FIG. 6, an error detected in unit 202A causes a trap to microcode (block 601), and a simultaneous inhibit of the write back of the output of the FP MADD unit (since the output can not be considered reliable). The trap to microcode triggers a set of run-time diagnostics to determine whether the error is in fact a hard error (unrecoverable) in the FP unit (block 602). If a hard error is confirmed, the contents of the FP register sets for threads A and B within floating point unit 202A are transferred to the alternate register sets (threads A' and B') within complementary floating point unit 202B. At the same time, floating point unit 202B suspends dispatching of new threads in the odd clock cycles to clear the pipe, so that new floating point operations are dispatched from the FP queue in processor 201A only on the even cycles (block 604). The alternate load/store paths from the L1 D-Cache in processor 201A to FP unit 202B are enabled (block 605). The time sliced mode of operation is then enabled in both processors (blocks 606,607). Processor 201A operates in FP disabled mode, whereby operations in its FP queue and data from its L1 D-Cache are transferred to FP unit 202A for processing, the operations being started in the pipe every odd cycle. Processor 202B operates in FP sharing mode, whereby it operates normally as before, except that it starts a new operation from its own queue in its own pipe every even cycle.

As described in the preferred embodiment above, an alternate pair of register sets 406, 407 is required in each of the FP units to hold data from the complementary processor in the event that the FP unit needs to operate in FP sharing mode. This arrangement provides an effective means for sharing pipeline function, but it will be recognized that it requires a doubling of the FP registers, where the alternate register sets are not normally used. Certain variations are possible which would avoid a doubling of the FP registers, but each of these has its own attendant disadvantages. For example, it would alternatively be possible to use only a pair of register sets for threads A and B, and in the event of sharing, assign the thread B register set to the complementary processor's primary thread data. In this case, only the primary thread in each processor could execute floating point operations. Ideally, threads would be assigned so that only threads without any floating point operations would be assigned as secondary threads. However, if the system architecture does not support such a capability, then a further variation of this alternative would be possible. If a floating point operation is encountered in a secondary thread and there are no pending floating point operations for the primary thread in the queue, a context switch could be performed in the floating point registers. I.e., the floating point register set corresponding to the processor in which a secondary thread has a floating point operation to perform could be swapped out to L1 D-Cache, and the secondary thread's data loaded into those registers. This obviously would involve some performance penalty, but it would allow the system to continue processing.

In the preferred embodiment described above, a shareable functional unit of a processor core is a floating point processing unit. However, it will be understood that a shareable functional unit in accordance with the present invention could be something other than a floating point unit. For example, a shareable unit might be an integer processing unit, or might be a combined vector processing unit which performs both integer and floating point arithmetic, or might be some other unit.

In the preferred embodiment described above, each processor core 201 supports the concurrent execution of multiple (preferably two) threads, and can dispatch multiple primitive instructions from either or both threads in a single machine cycle. However, it will be appreciated that these are simply processor design implementation details associated with a single embodiment, and that many variations may exist in processor design. By way of illustration, several such variations are mentioned herein, these being intended merely as examples and not as an exhaustive list of processor design variations. A processor according to the present invention might support more than two threads, or might support only a single thread of execution. Moreover, such a processor might be a design in which only one instruction is dispatched for execution in any one machine cycle. Such a processor might use any of various different multithreading techniques, such as fine-grained multithreading in which threads are rotated (usually on a cycle-by-cycle basis), or coarse-grained multithreading in which thread switches are triggered upon the occurrence of latency or other pre-defined events. Additionally, such a processor might be designed having a complex instruction format in which multiple operations are specified in each instruction, as in any of various Single Instruction—Multiple Data (SIMD), Multiple Instruction—Multiple Data (MIMD), Very Long Instruction Word (VLIW) and/or Wide Issue Superscalar processor designs.

Although a specific embodiment of the invention has been disclosed along with certain alternatives, it will be recognized by those skilled in the art that additional variations in form and detail may be made within the scope of the following claims:

What is claimed is:

1. A processing device, comprising:
   a plurality of processor cores on a common integrated circuit chip, each processor core containing a respective shareable functional unit for performing operations of a first type; and
   control logic detecting a failure of a first of said shareable functional units in a first processor core of said plurality of processor cores, and responsive to detecting said failure, placing a second functional unit in second processor core of said plurality of processor cores in a shared mode of operation, wherein said second functional unit executes operations of said first type originating in said first processor core concurrently with executing operations of said first type originating in said second processor core.

2. The processing device of claim 1, wherein said shareable function units are floating point units for performing floating point operations.

3. The processing device of claim 1, wherein said second function unit comprises:
   a set of primary input registers for holding input data to said second functional unit from said second processor core; and
   a set of alternate input registers for holding input data to said second functional unit from said first processor core when said second functional unit is in said shared mode of operation.

4. The processor of claim 1, wherein said processing device contains two processor cores.

5. The processing device of claim 1, wherein said shared mode of operation comprises sharing said second functional unit of a cycle-interleaved basis.

6. The processing device of claim 5, wherein said shareable functional units are pipelines, and wherein said shared mode of operation comprises initiating an operation in said second functional unit from different respective processor cores on a cycle-interleaved basis.

7. The processing device of claim 1, wherein said control logic further detects a failure of said second shareable functional unit, and responsive to detecting said failure of said second shareable functional unit, places said first functional unit in a shared mode of operation, wherein said first functional unit executes operations of said first type originating in said second processor core concurrently with executing operations of said first type originating in said first processor core.

8. The processing device of claim 7, wherein said first function unit comprises:
   a set of primary input registers for holding input data to said first functional unit from said first processor core; and
   a set of alternate input registers for holding input data to said first functional unit from said second processor core when said first functional unit is in said shared mode of operation.

9. The processing device of claim 1, wherein said first and second processing cores comprise respective functional unit operation queues, each queue holding a plurality of operations for execution by a shareable functional unit.

10. The processing device of claim 1, wherein each said processor core supports the concurrent execution of a plurality of threads.

11. The processing device of claim 1, wherein, if said control logic detects a failure in neither said first functional unit nor said second functional unit, both said first functional unit and said second functional unit operate in a normal mode of operation, wherein said first functional unit executes operations of said first type originating only in said first processor core, and said second functional unit executes operations of said first type originating only in said second processor core.

12. A digital data processing system, comprising:
   a memory;
   at least one multiple-processor-core device, each said-multiple-processor core device comprising:
      (a) a plurality of processor cores on a common integrated circuit chip, each processor core executing at least one respective thread of instructions stored in said memory, each processor core containing a respective shareable functional unit for performing operations of a first type; and (b) control logic detecting a failure of a first of said shareable functional units in a first processor core of said plurality of processor cores, and responsive to detecting said failure, placing a second functional unit in a second processor core of said plurality of processor cores in a shared mode of operation, wherein said second functional unit executes operations of said first type originating in said first processor core concurrently with executing operations of said first type originating in said second processor core; and at least one communications bus transmitting data between said memory and said at least one multiple-processor-core device.

13. The digital data processing system of claim 12, wherein said digital data processing system comprises a plurality of said multiple-processor-core devices.

14. The digital data processing system of claim 12, wherein said shared mode of operation comprises sharing said second functional unit of a cycle-interleaved basis.

15. The digital data processing system of claim 12, wherein said control logic further detects a failure of said second shareable functional unit, and responsive to detecting said failure of said second shareable functional unit, places said first functional unit in a shared mode of operation, wherein said first functional unit executes operations of said first type originating in said second processor core concurrently with executing operations of said first type originating in said first processor core.

* * * * *